United States Patent [19]

Sterman

[11] Patent Number: 4,811,662

[45] Date of Patent: Mar. 14, 1989

[54] METHOD FOR TINTING CONTACT LENSES

[75] Inventor: Saul C. Sterman, Jerusalem, Israel

[73] Assignee: Med Optics Corp., Panama, Panama

[21] Appl. No.: 95,206

[22] Filed: Sep. 11, 1987

[30] Foreign Application Priority Data

Sep. 16, 1986 [IL] Israel ......................... 80039

[51] Int. Cl.$^4$ ............................................. B41F 17/00
[52] U.S. Cl. ...................................... 101/170; 101/44; 8/507; 351/177
[58] Field of Search ................. 101/163, 170, 150, 35, 101/41, 44, 426, 114; 351/162, 177, 178; 8/507

[56] References Cited

U.S. PATENT DOCUMENTS

| 4,019,436 | 4/1977 | Handweiler et al. | 101/163 X |
| 4,543,882 | 10/1985 | Ryder et al. | 101/114 X |
| 4,559,897 | 12/1985 | Urrea et al. | 118/406 |
| 4,705,370 | 11/1987 | Johnson | 351/162 |
| 4,719,657 | 1/1988 | Bawa | 8/507 X |

FOREIGN PATENT DOCUMENTS

| 248819 | 1/1964 | Australia | 351/177 |
| 210877 | 4/1968 | U.S.S.R. | 101/163 |
| 803485 | 10/1958 | United Kingdom | 101/41 |
| 2180364 | 3/1987 | United Kingdom | 351/162 |

Primary Examiner—Clifford D. Crowder
Attorney, Agent, or Firm—Pollock, Vande Sande and Priddy

[57] ABSTRACT

A method for tinting contact lenses which comprises the following steps: providing contact lenses, at least one transfer-pad printer, including a suitable ink of the desired tint, and at least one printing block carrying an iris pattern, attaching the contact lenses to lens mounts, aligning the mounted lens with the pad of the transfer-pad printer, inking the printing block, causing the pad to pick up the iris pattern from the inked block, and causing the pad to make contact with the mounted lens, thereby transferring the iris pattern as picked up from the block to the mounted contact lens. A system for tinting contact lenses is also provided.

4 Claims, 2 Drawing Sheets

METHOD FOR TINTING CONTACT LENSES

The present invention relates to a method for tinting contact lenses, more particularly, soft contact lenses. It also refers to a system for tinting such lenses.

Tinting of contact lenses has been known for some years. A kit is available, which permits manufacturers as well as practitioners to tint contact lenses of the HEMA-type material by masking the pupil area and any other, e.g., peripheral, area that should remain clear, and applying a few drops of tint of the desired hue to the unmasked lens surface, letting it react with the latter for a specified period of time, and then rinsing off the excess tint. Some tints require a fixing solution. While this method is relatively simple, results are invariably poor: the solidly colored areas of the irises impart to the eyes the glassy, artificial look of doll's eyes. Real irises are of course never of a solid color, being streaky and even blotchy.

Attempts were also made to hand-paint irises onto lenses. Depending on the skill of the artist, immediate, visual results were apt to the quite good. However, not only were these hand-painted contact lenses too expensive for wider use, but the paint layer also interfered with oxygen permeability of the lens and rubbed off after comparatively short use.

Another commercially available tinted contact lens provides an iris pattern of acceptable naturalness which is printed onto the contact lens. The firm producing this lens has, however, not yet succeeded to achieve full control over hues and, therefore, reproducibility of the process they are using is rather poor. If one lens of a pair of lenses should get lost, it is rather difficult to obtain a matching lens.

It is one of the objects of the present invention to overcome the drawbacks and difficulties of prior-art methods for tinting of contact lenses, and to provide a method that, at relatively little expense. facilitates the tinting of such lenses, producing highly naturally looking irises of fully controllable and reproducible color and hue.

This the invention achieves by providing a method for tinting contact lenses, comprising the steps of:
 providing contact lenses;
 providing at least one transfer-pad printer, including a suitable ink of the desired tint;
 providing at least one printing block carrying an iris pattern;
 attaching said contact lenses to lens mounts;
 aligning said mounted lens with the pad of said transfer-pad printer:
 inking said printing block:
 causing said pad to pick up said iris pattern from said inked block, and
 causing said pad to make contact with said mounted lens, thereby transferring said iris pattern as picked up from said block to said mounted contact lens.

The invention further provides a system for tinting contact lenses, comprising:
 a transfer-pad printer adapted to pick up a pattern from an inked printing block and transfer said pattern to a workpiece;
 at least one lens mount adapted to fixedly hold a lens in a defined position, and
 means to produce alignment between said lens mount and said transfer pad prior to said pattern transfer from said pad to said lens.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
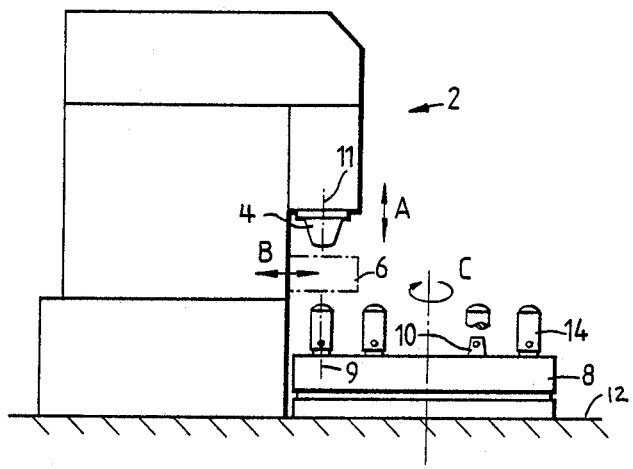
FIG. 1 is a schematic illustration of the tinting setup.
Figure 2:
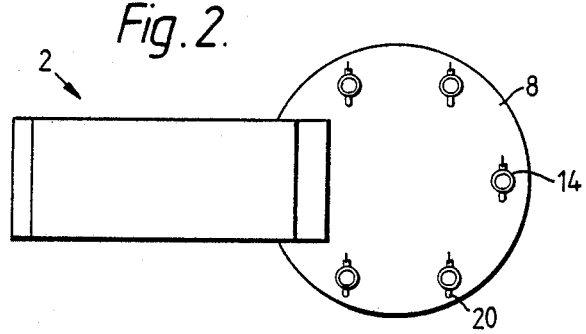
FIG. 2 is a top view of the setup of FIG. 1.

Referring now to the drawings, there is seen in FIGS. 1 and 2 a transfer-pad printer 2 provided with a pad 4 movable vertically in direction of double arrow A, and a printing-block holder 6 on which is mounted the block carrying the iris pattern (to be described further below) and which can move horizontally in direction of double arrow B. There is further seen an index table 8 rotatable in direction of arrow C. At uniform angular spacing, index table 8 is provided with tapering projections 10 defining what will be referred to as "stations", all of which projections are located on a circle the center of which lies on the axis of rotation of the index table 8. Both the transfer-pad printer 2 and the index table 8 are mounted on a common base 12, their mutual relationship being such that whenever the table 8 indexes, the center line 9 of one of the projections 10 is in accurate alignment with the center line 11 of the pad 4. In a manner to be explained further below, the indexing movement of the table 8 is coordinated with the up-and-down movement of the pad 4 and the in-and-out movement of the block holder 6.

Mounted on the projections 10 are lens mounts 14 (see FIG. 3), advantageously made of stainless steel, which, at their lower end, have a female taper 16 matching the tapering projections 10 integral with the indexing table 8. Their upper ends 18 are convexly spherical and have a radius of curvature R which is slightly smaller than the radius of curvature of the concave base curve of the (properly wetted) lens i.e., that surface of the contact lens that floats on the cornea. The reason for this difference in radii will be explained further below.

The matching tapers of the projection 10 and the female taper 16 ensure that the center of curvature of the upper end 18 of all lens mounts 14 is always located on their center line 9 which, in its turn, whenever a lens mount 14 is moved below the pad 4, is always aligned with the center line 11 of the pad 4. A pin 20, pushed into a hole drilled through both the projection 10 and the mount 14 locks the mount in position during the actual tinting operation.

Figure 3:
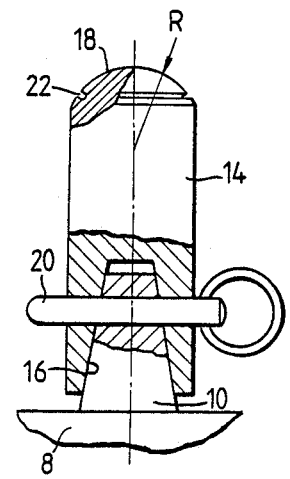
FIG. 3 shows a partly cross-sectional view of the lens mount.

There is further seen in FIG. 3 a groove 22, machined into the spherical end 18, which, as will become clear presently, facilitates centering of the lens on the lens mount 14.

In the following, a detailed description will be given of the tinting method according to the invention.

Figure 4:
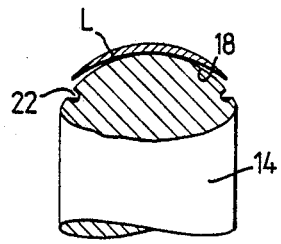
FIG. 4 shows a contact lens as freshly placed on a lens mount.
Figure 5:
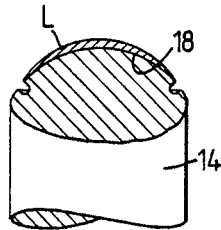
FIG. 5 shows the lens as shrunk onto the lens mount.
Figure 6:
FIGS. 6–9 show examples, enlarged and in black-and-white, of iris patterns as produced by the method according to the invention.
Figure 7:
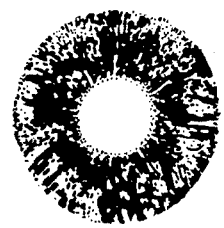
Figure 8:
Figure 9:

A lens L to be tinted is removed from the bottle in which it has been soaked for, e.g., 24 hours in saline or any other suitable soaking solution, and is placed onto the spherical end 18 of one of the lens mounts 14 which, at this stage, are not yet mounted on the index table 8. In FIG. 4, the difference in radii, being intentionally exaggerated, is clearly seen. Also seen is the centering groove 22 which, being of the same diameter as the fully soaked lens, serves as a reference circle for manually centering the lens L, to make sure that the center line 9 of the lens mount 14 passes through the center of the circular edge of the lens L.

Centering having been accomplished, the lens L is left on the mount 14 for a specified period of time, to allow a certain percentage of water to evaporate from the lens. It is during this evaporation process that the lens shrinks onto, and clings to, the mount 14 obviating the need for adhesive pitch or wax. The evaporation time period is of importance, as too wet a lens will not properly stick to the mount, and might develop air pockets and wrinkles which will obviously interfere with the printing or transfer process which requires a hard and smooth supporting surface. Too dry a lens on the other hand will not only cause the iris diameter to be of incorrect size, but the tint will not take, as the lens pores into which the ink must be absorbed are large enough only when the lens material has swelled to a certain size.

When determining the optimum evaporation period, the following factors must be taken into account:
 (1) the raw material of the lens;
 (2) ambient air conditions;
 (3) diameter of the printed iris, and
 (4) the additional time required for mounting the lens mount 14 on the index table and performing the actual printing step.

The latter is carried out with the aid of the transfer-pad printer 2 which operates as follows:

In a first stroke, the pad 4 picks up the pattern from the inked block mounted in the block holder 6 which, at this stage, projects from the printer as indicated by the dash-dotted lines in FIG. 1. Having picked up the pattern, the pad moves up again, the block holder 6 is withdrawn, clearing the path for the pad 4 to move down again and, in this second working stroke, to place the pattern onto the lens that has previously been moved by the index table 8 from the "waiting" to the "printing" position. The table 8 which has several stations is coordinated in its indexing steps with the movements of the printer 2 and may move only in the time period between the upstroke of the pad 4 after printing and the withdrawal of the block holder 6 in preparation for the next printing stroke.

Having been imprinted, and, over a specified time, soaked in the printed pattern, the lens, together with its mount 14 to which it still adheres, is transferred to an ultrasonic bath, in which the excess paint is removed. The mount 14 is suspended upside down with the aid of a suspending pin inserted into the hole provided for the immobilizing pin 20. In the course of the cleaning operation, the lens again absorbs liquid, swells and simply drops off the mount 14.

Having been removed from the bath, the lens is carefully tested for print quality and possible manufacturing defects and is then re-bottled. The bottle is sealed, labeled and, finally, autoclaved for sterileness of its contents.

FIGS. 6 to 9 represent examples of enlarged iris patterns as produced by the method according to the invention. As can be seen, the patterns differ in the diameters of the irises as well as of the pupils.

In the patterns as shown in the drawings, the black represents the tint, and the white, the transparent portions through which the original iris color shows, producing the characteristic streaks, blotches and dots.

The ink used is of a high viscosity and as patterns picked up by the pad 4 are always of the same tint density (the "doctor knife" of the printer always removing any excess ink from the block), and the pressure on the pad 4 is always the same-(for a given tint). reproducibility is ensured.

While the above-mentioned matching male and female tapers ensure perfect concentricity, such tapers are not easily produced, taking into account that it is also necessary to ensure uniform height of the mounts 14 on the indexing table 8. A simpler solution would be to ensure concentricity by having both the projection 10 and the bore in the mount 14 cylindrical, with the projection 10 being a smooth sliding fit in the bore.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for tinting contact lenses, comprising the steps of:
 providing contact lenses;
 providing at least one transfer-pad printer, including a suitable ink of the desired tint;
 providing at least one printing block carrying an iris pattern;
 presoaking said contact lenses in a soaking liquid;
 placing said presoaked lenses onto lens mounts;
 letting said presoaked lenses dry for a predetermined time while placed on said mounts, whereby said lenses are shrunk onto said mounts;
 aligning a lens thus mounted with the pad of said transfer-pad printer;
 inking said printing block;
 causing said pad to pick up said iris pattern from said inked block, and
 causing said pad to make contact with said mounted lens, thereby transferring said iris pattern as picked up from said block to said mounted contact lens.

2. The method as claimed in claim 1, comprising the further step of centering said lenses, prior to the shrinking thereof onto said lens mounts, relative to reference features provided on said mounts.

3. The method as claimed in claim 1, comprising, after said iris pattern transfer, the further step of letting said pattern be soaked into the pores of said lens for a predetermined period of time prior to the removal thereof from said mount.

4. The method as claimed in claim 3, comprising the further step of providing an ultrasonic bath in which, after said socking-in period, any excess ink is removed and the dry lens, enabled to reabsorb liquid, is caused to swell and drop off said mount.

* * * * *